United States Patent Office 3,660,307
Patented May 2, 1972

3,660,307
PROCESS FOR REGENERATING FLUORINATION CATALYSTS OF THE CHROMOXY-FLUORIDE GROUP
Otto Scherer, Bad Soden, Taunus, Paul Peter Rammelt and Jürgen Korinth, Hofheim, Taunus, and Peter Frisch, Schwalheim, Germany, assignors to Farbwerke Hoechst Aktiengesellschaft vormals Meister Lucius & Bruning, Frankfurt am Main, Germany
No Drawing. Filed Apr. 4, 1969, Ser. No. 813,692
Claims priority, application Germany, Apr. 11, 1968,
P 17 67 200.3
Int. Cl. B01j 11/76, 11/02
U.S. Cl. 252—415
5 Claims

ABSTRACT OF THE DISCLOSURE

Process for regenerating fluorination catalysts of the chromoxy-fluoride group, wherein hydrogen fluoride is passed over the catalyst at 100°–600° C. in an amount of at least 5 g. per liter of catalyst per hour. By the process the initial activity of said catalysts can be restored in an economic way.

---

The present invention provides a process for the regeneration of fluorination catalysts from the group of chromoxyfluorides.

Fluorination catalysts belonging to the group of chromoxyfluorides obtainable, for example, by fluorination of hydrated oxides of trivalent chromium, such as chromium-(III)-hydroxide or hydrated chromic oxide (Guignet's green) with hydrogen fluoride or by heating hydrated chromic trifluoride in a current of oxygen or nitrogen are highly active compounds. In fluorination reactions i.e. reactions of chloro-carbons or chlorinated hydrocarbons with hydrogen fluoride this property i.a. ensures an especially high conversion of hydrogen fluoride. This fact is most important for technology considering the smaller loss in unconverted hydrogen fluoride and facilitated work up of the crude fluorination gases. The use of these catalysts for example permits one to achieve in the fluorination of chloroform to trifluoromethane a conversion rate in hydrogen fluoride of more than 98%. In the flurination of hexachloroethane to trifluorotrichloroethane this rate amounts to above 97%, in case of carbon tetrachloride converted to monofluorotrichloro-methane and difluorodichloromethane to above 99%.

However, it has been observed that with such high conversion rates of hydrogen fluoride the activity of the chromoxy fluoride catalyst may gradually weaken without detectable damage due, for example, to deposition of organic decomposition products.

Such decline in activity is primarily reflected in a decreasing hydrogen fluoride conversion at unchanged throughput i.e. the partial pressure of hydrogenfluoride in the fluorination mixture slowly rises, however, without retarding the decrease in the activity.

It has been found that it is possible to regenerate fluorination catalysts of the chromoxy fluoride group i.e. to restore their initial activity, when passing pure gaseous hydrogen fluoride over the catalyst at temperatures of about 100° to 600° C. in an amount of at least 5 g. per litre of catalyst per hour.

Treatment of the catalyst with hydrogen fluoride is suitably effected at temperatures between 150° and 400° C., advantageously at the reaction temperature of each individual fluorination; i.e. for example in the fluorination of $CCl_4$ to $CCl_3F$ or $CCl_2F_2$ in the range from 160° to 200° C., in case of $CHCl_3$ fluorinated to $CHF_3$ between 200° and 300° C. and with hexachloroethane fluorinated to trifluorotrichloroethane between 250° and 400° C.

The regeneration of the catalyst can be performed in a simple manner by eliminating in the course of the fluorination the remaining components and solely allowing hydrogen fluoride to further pass over the catalyst under otherwise similar conditions.

The pressure of hydrogen fluoride used for the regeneration may vary within wide limits e.g. between 1 and 10 atmospheres or even above. Preferably, pressures of about 1 to 5 atmospheres are applied. Pressures higher than 1 atmosphere, of, for example, 3 to 5 atmospheres offer the advantage of bringing about the regeneration effect in shorter time.

The time required for regeneration depends upon the regeneration frequency i.e. the interval between two regenerations or the decrease in activity which has occurred in the interim, moreover, upon temperature and pressure inasmuch as with higher temperatures and pressures shorter time periods are required than with lower ones.

Generally, the regeneration time is 1 to 60 hours, preferably 3 to 40 hours. Regeneration times exceeding that limit do not affect the catalyst but may present the drawback that in subsequent use the catalyst does not immediately act.

The hydrogen fluoride which is passed over the catalyst at regeneration may be condensed, subsequently, and/or reemployed in another fluorination reaction. Since in fluorination processes conducted on an industrial scale it is desirable to carry out the production in a continuous and uniform way, it is an advantageous procedure to keep in operation several reactors together or subdivide one reactor into several segments and regenerate by turns each reactor or each segment feeding, after the regeneration, the hydrogen fluoride used into the remaining reaction units involved in the fluorination process.

In general, 5–500 g. of hydrogen fluoride, preferably 20–300 g. per liter of catalyst per hour are used correspondingly longer regeneration times being required with smaller quantities of hydrogen fluoride.

The present invention is applied to advantage particularly in the fluorination of $CCl_4$ to $CCl_3F$ or $CCl_2F_2$ in the presence of a chromoxy fluoride catalyst obtained by fluorination of hydrated chromic oxide. In this case regeneration temperatures of 160°–250° C., particularly 170–210° C. and pressures of 2–7 atmospheres, preferably 3–5 atmospheres are applied at a frequency of regeneration of 4 to 8 preferably 6–7 days.

The fact that by the instant process the life of fluorination catalysts of the chromoxyfluoride group is manifold prolonged is a considerable advance for technology.

The following examples illustrate the invention but they are not intended to limit it thereto the parts and percentages being by weight unless otherwise states.

EXAMPLE 1

A chromoxyfluoride catalyst prepared by fluorination of hydrated chromic oxide (Guignet's green) had suffered a loss in activity while used in the fluorination of $CCl_4$ i.e. when 582 g. of $CCl_4$ and 125 g. of hydrogen fluoride per litre of catalyst per hour had passed over the catalyst at a reaction temperature of 200° C., a conversion of hydrogen fluoride of 98.8% was ascertained. The catalyst was, subsequently, treated for nine and a half hours at 200° C. with 60 g. of hydrogen fluoride per liter of catalyst per hour. In subsequent fluorination of $CCl_4$ under the aforesaid conditions in the presence of the so-treated catalyst a hydrogen fluoride conversion of 99.1% was obtained.

EXAMPLE 2

The catalyst of Example 1 with which a hydrogen fluoride conversion of 99.1% had been ascertained was treated once more by hydrogen fluoride i.e. using for four hours 60 g. of hydrogen fluoride per litre of catalyst per hour at 300° C. In subsequent fluorination of CCl₄ carried out under the conditions of Example 1 with use of this catalyst a hydrogen fluoride conversion of 99.4% was ascertained.

EXAMPLE 3

3000 g. of CCl₄ and 600 g. of hydrogen fluoride were reacted in the presence of an aluminium fluoride catalyst up to a conversion of about 76% referred to the amount of hydrogen fluoride used. Subsequently, the reaction mixture was passed at about 180° C. over a catalyst obtained by fluorination of hydrated chromic oxide (pourability 2.5 l.). The conversion achieved with this catalyst amounted to 98.8% referred to the quantity of hydrogen fluoride. When the conversion had decreased during the use of the catalyst to 96.8%, 600 g. of hydrogen fluoride per hour were passed for 19 hours over the catalyst at about 170° C. After this the conversion of hydrogen fluoride in the above reaction was 98.5%. By subsequent treatment with 300 g. of hydrogen fluoride per hour during 58 hours, the conversion of hydrogen fluoride rose, in subsequent fluorination of CCl₄ carried out under the above-specified conditions, to 98.7%.

EXAMPLE 4

With a chromoxyfluoride catalyst as described in Example 3, after a several days' fluorination of CCl₄, a conversion of hydrogen fluoride of 97.6% was obtained, whereupon the catalyst was treated at about 170° C. for 15 hours at a pressure of 3 atmospheres with 600 g. of hydrogen fluoride per hour. The hydrogen fluoride conversion amounted in fluorination of CCl₄ as per Example 3 to 99.0%.

EXAMPLE 5

With a chromoxyfluoride catalyst as described in Example 3 in fluorination of CCl₄ according to said example at a reaction pressure of 3 atmospheres, a hydrogen fluoride conversion of 99.5% was obtained. The catalyst was regenerated every 6–8 days with hydrogen fluoride at about 175° C. at a pressure of 3 atmospheres. The quantity of hydrogen fluoride amounted every first time to 600 g. per hour, the reaction time to 8 hours; later the amount of hydrogen fluoride was 100 g. per hour the regeneration time being 24 hours. The rate of hydrogen fluoride conversion could thus be maintained for more than 12 weeks between 99.5 and 98.8%. Without treatment by hydrogen fluoride the conversion of the latter compound decreased within about 3 weeks to about 97.5%.

What is claimed is:

1. A process for regenerating a chromoxy fluoride catalyst which consists in passing over said catalyst at least 5 grams pure gaseous hydrogen fluoride per liter of catalyst per hour at a temperature from 100° to 600° C. in from 1 to 60 hours.

2. A process according to claim 1 wherein 20 to 300 grams of hydrogen fluoride per liter of catalyst are passed over the catalyst in from 3 to 40 hours.

3. A process according to claim 1 wherein the temperature is from 150° to 400° C.

4. A process according to claim 1 wherein the hydrogen fluoride is passed over the catalyst at a pressure of 1 to 10 atmospheres.

5. A process according to claim 4 wherein the hydrogen fluoride is passed over the catalyst at a pressure of 3 to 5 atmospheres.

References Cited

UNITED STATES PATENTS

| | | | |
|---|---|---|---|
| 2,745,886 | 5/1956 | Ruh et al. | 260—653.7 |
| 3,385,794 | 5/1968 | Sherer et al. | 252—415 |

PATRICK P. GARVIN, Primary Examiner

P. E. KONOPKA, Assistant Examiner

U.S. Cl. X.R.

260—653.7